(12) United States Patent
Maeda et al.

(10) Patent No.: US 9,261,109 B2
(45) Date of Patent: Feb. 16, 2016

(54) TURBINE HOUSING AND EXHAUST GAS TURBINE SUPERCHARGER

(75) Inventors: Osamu Maeda, Toyota (JP); Kouji Nagai, Nagoya (JP); Tomoyuki Isogai, Toyota (JP); Hiroki Matsui, Toyota (JP); Masanori Saeki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/511,060

(22) PCT Filed: Jul. 6, 2011

(86) PCT No.: PCT/JP2011/065502
§ 371 (c)(1),
(2), (4) Date: May 21, 2012

(87) PCT Pub. No.: WO2013/005319
PCT Pub. Date: Jan. 10, 2013

(65) Prior Publication Data
US 2014/0119907 A1     May 1, 2014

(51) Int. Cl.
*F04D 29/40* (2006.01)
*F01D 9/02* (2006.01)
*F02C 6/12* (2006.01)

(52) U.S. Cl.
CPC .............. *F04D 29/40* (2013.01); *F01D 9/026* (2013.01); *F02C 6/12* (2013.01); *F05D 2220/40* (2013.01); *F05D 2230/54* (2013.01)

(58) Field of Classification Search
CPC .......................... F01D 29/40; F05D 2230/54
USPC ................................................ 415/204, 205
See application file for complete search history.

(56) References Cited

U.S. PATENT DOCUMENTS

| 2,860,827 | A  | * | 11/1958 | Egli | 415/164 |
| 7,074,009 | B2 | * | 7/2006 | Allmang et al. | 415/177 |

(Continued)

FOREIGN PATENT DOCUMENTS

| DE | 3831687 A1 | * | 3/1990 |
| JP | U-63-183432 | | 11/1988 |
| JP | B2-07-113139 | | 12/1995 |

(Continued)

OTHER PUBLICATIONS

Sudmanns, Radial flow turbine with spiral housing of variable flow cross-section, Mar. 29, 1990, DE 3831687A1 abstract.*

(Continued)

*Primary Examiner* — Nathaniel Wiehe
*Assistant Examiner* — Eldon Brockman
(74) *Attorney, Agent, or Firm* — Oliff PLC

(57) ABSTRACT

A turbine housing includes an outer housing member, which has a proximal housing portion and a distal housing portion, and an inner housing member, which is provided inside the outer housing member and has a shroud surface that faces a turbine wheel in an axial direction. A distal portion of the inner housing member serves as a slide portion slidable in the axial direction. Further, a proximal portion of the inner housing member is fixed to the proximal housing portion at a part closer to a distal side than a proximal portion of the proximal housing portion. Further, a scroll portion is formed by the inner housing member and a proximal scroll portion of the proximal housing portion located closer to a proximal side than the inner housing member.

11 Claims, 2 Drawing Sheets

(56) References Cited

U.S. PATENT DOCUMENTS

| | | | |
|---|---|---|---|
| 8,628,296 B2 * | 1/2014 | Grussmann et al. | 415/204 |
| 2007/0113550 A1 * | 5/2007 | Sausee et al. | 60/598 |

FOREIGN PATENT DOCUMENTS

| | | |
|---|---|---|
| JP | A-2002-004871 | 1/2002 |
| JP | A-2005-106014 | 4/2005 |
| JP | A-2006-161579 | 6/2006 |
| JP | 2007-278130 | 10/2007 |
| JP | A-2007-254885 | 10/2007 |
| JP | A-2010-285989 | 12/2010 |

OTHER PUBLICATIONS

Oct. 11, 2011 International Search Report issued in Patent Application No. PCT/JP2011/065502 (with translation).

* cited by examiner

Fig.3
Fig.4
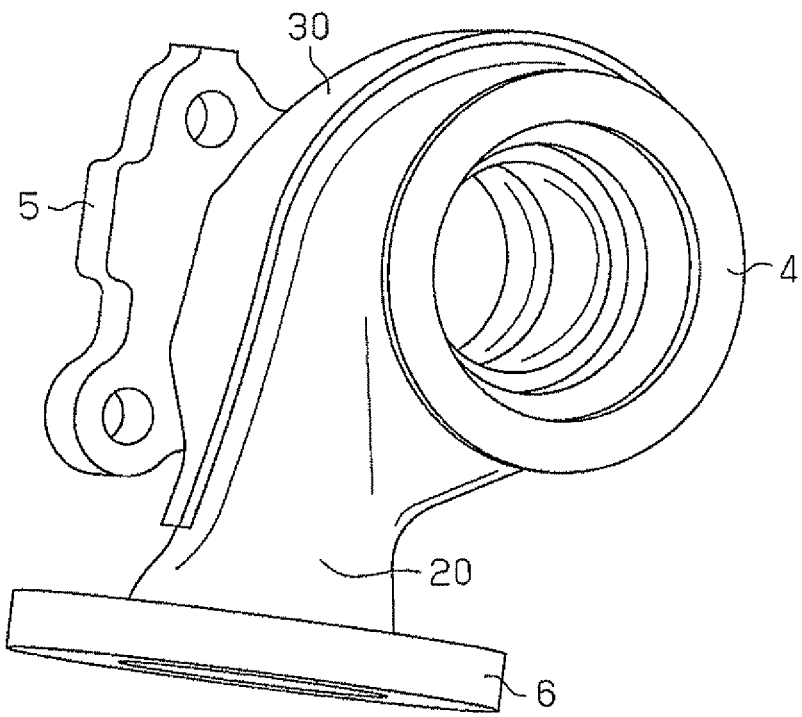
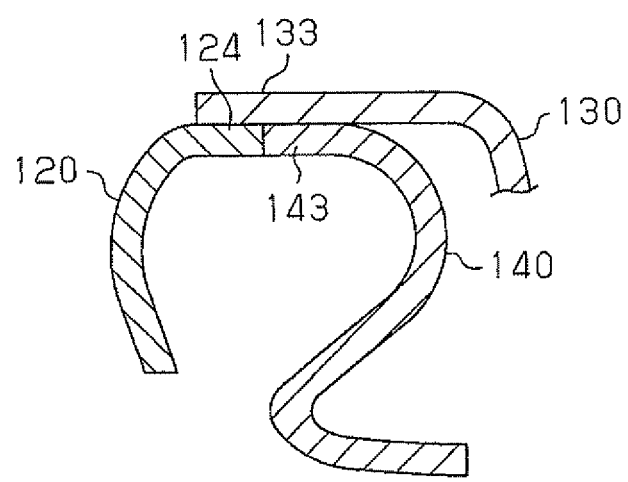

TURBINE HOUSING AND EXHAUST GAS TURBINE SUPERCHARGER

FIELD OF THE INVENTION

The present invention relates to an exhaust gas turbine supercharger for supercharging by a turbine wheel being rotated by exhaust gas energy and to a turbine housing, which is a housing of the exhaust gas turbine supercharger and encloses the turbine wheel.

BACKGROUND OF THE INVENTION

Conventionally, for example, Patent Document 1 discloses such a turbine housing and an exhaust gas turbine supercharger.

The turbine housing disclosed in Patent Document 1 includes an impeller housing member (5) enclosing a turbine impeller (9), a discharge pipe (10) connected to a downstream portion of the impeller housing member (5), and an outer housing member (2) enclosing the impeller housing member (5) and the discharge pipe (10) as shown in FIG. 1 of Patent Document 1. That is, a distal portion (left end portion in FIG. 1 of Patent Document 1) of the impeller housing member (5) is connected to the discharge pipe (10), and a proximal portion (right end portion in FIG. 1 of Patent Document 1) thereof is fixed to a proximal portion of the outer housing member (2), whereby a scroll portion is formed only by the impeller housing member (5).

Further, a nozzle (8) of the impeller housing member (5) is provided slidably relative to the discharge pipe (10) of an outlet flange (4).

According to this configuration, since the distal portion of the impeller housing member (5) is slidable in an axial direction of the turbine impeller (9), it is possible to limit an external force acting on the impeller housing member (5) in a direction toward the blades of the turbine impeller (9) due to temperature decrease of the outer housing member (2) and the discharge pipe (10). Thus, changes in the clearance between the turbine impeller (9) and the shroud surface of the impeller housing member (5), i.e., the tip clearance, are reduced.

Further, the rigidity of the outer housing member (2) is increased since both ends thereof are respectively coupled to the flanges (3) and (4).

PRIOR ART DOCUMENT

Patent Document

Patent Document 1: Japanese Laid-Open Patent Publication No. 2010-285989

SUMMARY OF THE INVENTION

In the turbine housing disclosed in the above Patent Document 1, the proximal portion of the impeller housing member (5) (hereinafter, referred to as an inner housing member) is fixed to the proximal portion of the outer housing member to form the scroll portion. Further, as described above, the distal portion of the inner housing member is supported slidably in the axial direction and the inner housing member has a cantilever structure. Thus, the cantilever length of the inner housing member tends to be long and the rigidity thereof tends to be low, so a measure for increasing the rigidity such as increasing the thickness of the inner housing member needs to be taken. As a result, there arises a problem of an increase in the weight of the inner housing member.

Accordingly, it is an objective of the present invention to provide a turbine housing and an exhaust gas turbine supercharger capable of reliably suppressing vibration of an inner housing member while reducing a weight increase.

To achieve the foregoing objective, a turbine housing for enclosing a turbine wheel according to the present invention includes an outer housing member and an inner housing member provided inside the outer housing member. The inner housing member has a shroud surface, which faces a blade portion of the turbine wheel in an axial direction of the turbine wheel. When a side close to a turbine shaft in the axial direction is referred to as a proximal side and a side distant from the turbine shaft is referred to as a distal side, a distal portion of the inner housing member is a movable portion displaceable relative to the outer housing member in the axial direction. A proximal portion of the inner housing member is fixed to the outer housing member at a part closer to the distal side than a proximal portion of the outer housing member. A scroll portion is formed by the inner housing member and a part of the outer housing member that is located closer to the proximal side than the inner housing member.

According to this configuration, since the distal portion of the inner housing member is displaceable in the axial direction of the turbine wheel, an external force acting on the inner housing member in a direction toward the blade portion of the turbine wheel due to a temperature decrease of the outer housing or the like can be limited. Therefore, changes in the clearance between the turbine wheel and the inner housing member, i.e., a tip clearance, can be reduced.

Further, the proximal portion of the inner housing member is fixed to the outer housing member on a part closer to the distal side than the proximal portion of the outer housing member, and the scroll portion of the turbine housing is formed by the inner housing member and a part of the outer housing member located closer to the proximal side than the inner housing member. Thus, unlike a conventional turbine housing, i.e., a configuration in which a proximal portion of an inner housing member is fixed to a proximal portion of an outer housing, thereby forming a scroll portion only by the inner housing member, the cantilever length of the inner housing member is reduced. This enables the rigidity of the inner housing member to be increased without increasing the thickness thereof. Therefore, vibration of the inner housing member is reliably suppressed while a weight increase is reduced.

In this case, the outer housing member preferably includes a proximal housing portion for covering a proximal portion of the turbine wheel and a distal housing portion provided closer to the distal side than the proximal housing portion, wherein the housing portions are split from each other.

According to the aspect, the outer housing member having a complicated shape to form a part of the scroll portion of the turbine housing can be easily formed, for example, by die pressing.

In this case, a distal portion of the proximal housing portion, a proximal portion of the distal housing portion, and the proximal portion of the inner housing member are preferably joined to overlap each other.

According to the aspect, a part of the scroll portion of the turbine housing has a triplex structure by joining these housing portions and inner housing member to each other. Thus, the rigidity of this part is further increased. Therefore, even if blades of the turbine wheel are crushed and scattered due to entry of foreign matter, penetration of crushed pieces through the turbine housing can be reliably prevented.

A distal portion of the proximal housing portion, a proximal portion of the distal housing portion, and the proximal portion of the inner housing member preferably extend in the axial direction.

According to the aspect, mold removal can be easily performed when these housing portions and inner housing member are formed by die pressing. Therefore, the turbine housing according to the present invention can be easily embodied.

The proximal housing portion preferably has a higher rigidity than the distal housing portion.

Since the inner housing member is present inside the distal housing portion, heat in the turbine housing is transferred to the distal housing portion via the inner housing member. On the other hand, since the heat in the turbine housing is directly transferred to the proximal housing portion, the proximal housing portion receives more heat than the distal housing portion and is more likely to reach a high temperature. As a result, a problem may arise that the proximal housing portion tends to be thermally deformed.

In this respect, since the proximal housing portion has a higher rigidity than the distal housing portion according to the above aspect, thermal deformation of the proximal housing portion can be reliably limited. Further, it is not necessary to unnecessarily increase the rigidity of the distal housing portion.

The proximal housing portion and the distal housing portion are preferably formed of the same material, and the proximal housing portion is preferably thicker than the distal housing portion.

According to the aspect, the rigidity of the proximal housing portion can be easily made higher than that of the distal housing portion.

A supporting member for displaceably supporting the movable portion of the inner housing member is preferably coupled to the inner peripheral surface of the outer housing member, and a sealing member for sealing a clearance between the movable portion and the supporting member is preferably provided between the movable portion and the supporting member.

According to the configuration, leakage of exhaust gas from the clearance between the slide portion and supporting member is limited by the sealing member while the slide portion of the inner housing member is slidably supported by the supporting member coupled to the inner peripheral surface of the outer housing member.

In this case, the sealing member is preferably formed of ceramic fibers and a binding agent.

According to the aspect, even if the size of the clearance between the movable portion and the supporting member changes due to thermal expansion of the movable portion of the inner housing member and the supporting member supporting the movable portion, the sealing member is deformed according to the size of the clearance due to thermal expansion of the binding agent. Therefore, leakage of exhaust gas from the clearance between the movable portion and the supporting member can be reliably limited even under high temperatures.

The proximal housing portion, the distal housing portion, and the inner housing member are preferably respectively formed using a metal plate.

According to this configuration, since the turbine housing is formed using a metal plate, the thermal capacity of the turbine housing itself can be easily reduced as compared with the case where the turbine housing is formed by casting. Therefore, the warm-up performance of a catalytic device arranged downstream of the exhaust gas turbine supercharger including the turbine housing in exhaust gas flow direction is improved.

An exhaust gas turbine supercharger for supercharging by a turbine wheel being rotated by exhaust gas energy preferably includes the turbine housing according to above described invention.

BRIEF DESCRIPTION OF THE DRAWINGS

FIG. 3 is a perspective view showing a perspective structure of the turbine housing of the embodiment as viewed from the corresponding to the proximal flange; and FIG. 4 is a cross-sectional view showing a cross-sectional structure around a scroll portion of the turbine housing according to a modification of the present invention.

DETAILED DESCRIPTION OF THE PREFERRED EMBODIMENTS

A turbine housing and an exhaust gas turbine supercharger according to one embodiment of the present invention will be described with reference to FIGS. 1 to 4.

Figure 1:
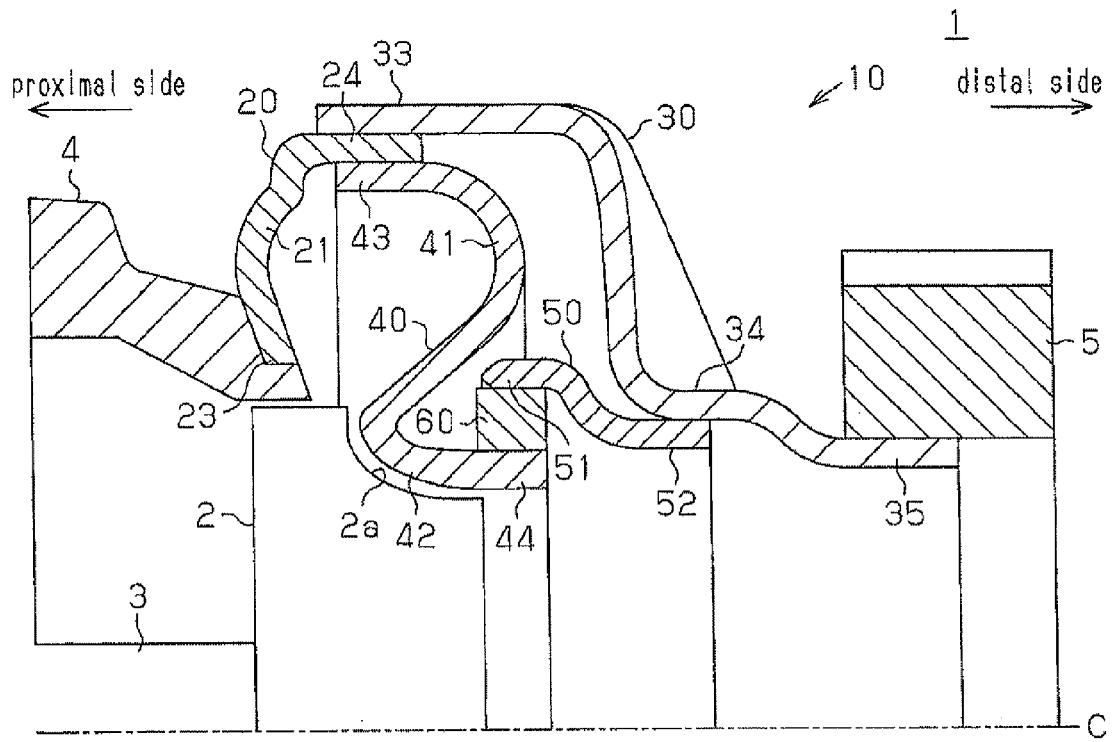
FIG. 1 is a partial cross-sectional view showing a partial cross-sectional structure of an exhaust gas turbine supercharger for one embodiment of a turbine housing and the exhaust gas turbine supercharger according to the present invention.
Figure 2:
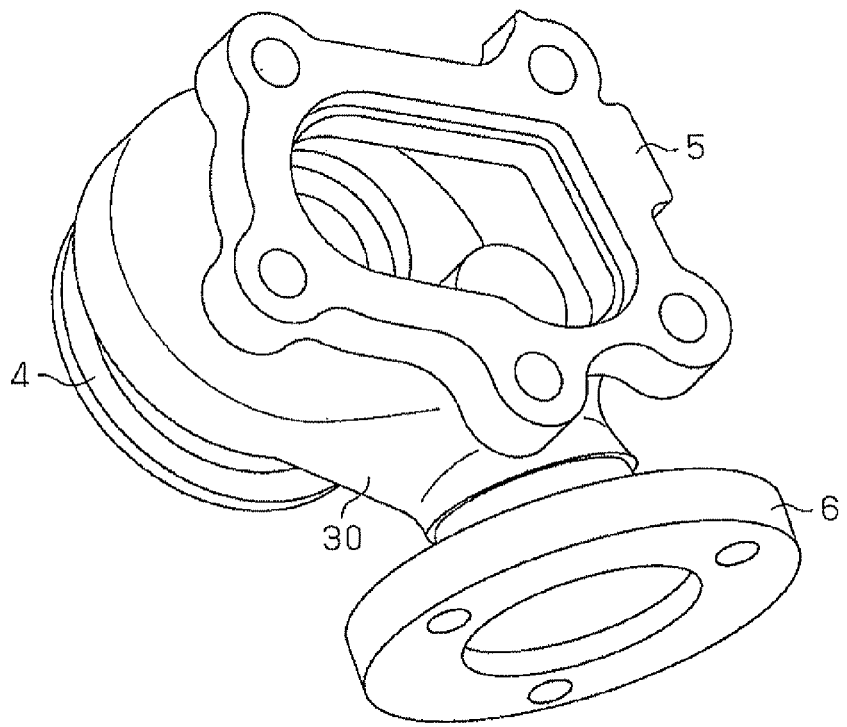
FIG. 2 is a perspective view showing a perspective structure of the turbine housing of the embodiment as viewed from the side corresponding to the distal flange.

FIG. 1 shows a partial cross-sectional structure of an exhaust gas turbine supercharger 1 in this embodiment. FIG. 2 shows a perspective structure of a turbine housing 10 as viewed from the side corresponding to a distal flange 5. FIG. 3 shows a perspective structure of the turbine housing 10 as viewed from the side corresponding to a proximal flange 4.

In the following description, a side close to a turbine shaft 3 in an axial direction C of a turbine wheel 2 (left side in FIG. 1) is referred to as a proximal side and a side distant from the turbine shaft 3 (right side in FIG. 1) is referred to as a distal side.

As shown in FIGS. 1 to 3, the exhaust gas turbine supercharger 1 includes the turbine shaft 3 rotationally supported by an unillustrated bearing, a turbine wheel 2 coupled to the turbine shaft 3 and a turbine housing 10 enclosing the turbine wheel 2 and forming a scroll portion.

The turbine housing 10 is arranged between the proximal flange 4 coupled to a bearing housing and the distal flange 5 coupled to a downstream exhaust pipe. The turbine housing 10 is roughly composed of an outer housing member having a split structure and an inner housing member 40 provided inside the outer housing member. The outer housing member includes a proximal housing portion 20 and a distal housing portion 30 split from each other. A flange denoted by 6 in FIGS. 2 and 3 is an upstream flange 6 coupled to an exhaust manifold.

The proximal housing portion 20 forms a part on the proximal side of the outer housing member and is provided to cover a proximal portion of the turbine wheel 2. A proximal portion 23 of the proximal housing portion 20 is joined to the outer peripheral surface of the distal end of the proximal flange 4. The proximal housing portion 20 is formed with a proximal scroll portion 21 extending from the proximal portion 23 toward the outer periphery. Further, a distal portion 24 is formed to extend from an outer peripheral portion of the proximal scroll portion 21 in the axial direction C.

The distal housing portion 30 forms a part on the distal side of the outer housing member and is provided to cover the inner housing member 40 and a supporting pipe 50, which will be described below. A proximal portion 33 of the distal housing portion 30 extends in the axial direction C. The inner peripheral surface of the distal housing portion 30 is joined to the outer peripheral surface of the distal portion 24 of the proximal housing portion 20. Further, the distal housing portion 30 has a first reduced diameter portion 34, which has a smaller diameter than the proximal portion 33 and is located on the distal side of the proximal portion 33. The distal housing portion 30 also has a second reduced diameter portion 35, which has a smaller diameter than the first reduced diameter portion 34 and is located on the distal side of the first reduced diameter portion 34. The outer peripheral surface of the second reduced diameter portion 35 is joined to the inner peripheral surface of the distal flange 5.

The inner housing member 40 has a shroud surface 42 facing a blade portion 2a of the turbine wheel 2 in the axial direction C. Specifically, the inner housing member 40 has a substantially S-shaped cross section. A proximal portion 43 of the inner housing member 40 extends in the axial direction C and the outer peripheral surface thereof is joined to the inner peripheral surface of the distal portion 24 of the proximal housing portion 20. That is, the distal portion 24 of the proximal housing portion 20, the proximal portion 33 of the distal housing portion 30, and the proximal portion 43 of the inner housing member 40 are joined by arc welding to overlap each other. Further, a substantially arcuate distal scroll portion 41 is connected to the proximal portion 43. A scroll portion, which is a passage for introducing exhaust gas exhausted from the exhaust manifold to the blade portion 2a of the turbine wheel 2, is formed by the distal scroll portion 41 and the proximal scroll portion 21 of the proximal housing portion 20. Further, a part having the shroud surface 42 in the form of a curved surface is connected to the distal scroll portion 41. Further, the distal portion of the inner housing member 40 extends in the axial direction C and serves as a slide portion 44 slidable in the axial direction C as described in detail later.

In this embodiment, the proximal housing portion 20, the distal housing portion 30 and the inner housing member 40 are respectively formed by pressing a stainless steel sheet using a die.

The supporting pipe 50 is coupled to the inner peripheral surface of the distal housing portion 30. Specifically, a proximal portion of the supporting pipe 50 is formed into an enlarged diameter portion 51 and a distal portion thereof is formed into a reduced diameter portion 52 having a smaller diameter than the enlarged diameter portion 51. Further, the outer peripheral surface of the reduced diameter portion 52 of the supporting pipe 50 is joined to the inner peripheral surface of the first reduced diameter portion 34 of the distal housing portion 30. Further, the enlarged diameter portion 51 is arranged to cover the slide portion 44 of the inner housing member 40, and a sealing member 60 for sealing the clearance between the enlarged diameter portion 51 and the slide portion 44 is provided between the inner peripheral surface of the enlarged diameter portion 51 and the outer peripheral surface of the slide portion 44. In this embodiment, a ceramic fiber mat is adopted as the sealing member 60. This sealing member 60 has a function of binding heat-resistant ceramic fibers (e.g. alumina) and ceramic fibers, contains a binding agent having a high coefficient of thermal expansion, and is conventionally generally used as a sealing member in catalytic devices of vehicle-mounted internal combustion engines and the like. By this configuration, the slide portion 44 of the inner housing member 40 is supported slidably in the axial direction C by the supporting pipe 50.

Next, operation of this embodiment will be described.

The slide portion 44, which is the distal portion of the inner housing member 40, is slidable in the axial direction C. Thus, even if the proximal housing portion 20 and the supporting pipe 50 are thermally shrunk as the temperature thereof decreases, an external force acting on the inner housing member 40 in a direction toward the blade portion 2a of the turbine wheel 2 is reduced. This limits changes of the clearance between the turbine wheel 2 and the shroud surface 42 of the inner housing member 40, i.e., the tip clearance.

Further, the proximal portion 43 of the inner housing member 40 is fixed to the proximal housing portion 20 at a part closer to the distal side than the proximal portion 23 of the proximal housing portion 20, and the scroll portion of the turbine housing 10 is formed by the inner housing member 40 and the proximal scroll portion 21 of the proximal housing portion 20, which is located closer to the proximal side than the inner housing member 40. Thus, unlike a conventional turbine housing, i.e., a configuration in which a proximal portion of an inner housing member is fixed to a proximal portion of an outer housing, thereby forming a scroll portion only by the inner housing member, the cantilever length of the inner housing member 40 is shorter. This enables the rigidity of the inner housing member 40 to be increased without increasing the thickness thereof.

Further, a part of the scroll portion of the turbine housing 10 has a triplex structure by joining the proximal housing portion 20, the distal housing portion 30 and the inner housing member 40 to each other. Thus, the rigidity of this part is increased. Accordingly, even if the blades of the turbine wheel 2 are crushed and scattered due to entry of foreign matter, penetration of crushed pieces through the turbine housing 10 is reliably prevented.

Further, the slide portion 44 of the inner housing member 40 is slidably supported by the supporting pipe 50 coupled to the inner peripheral surface of the distal housing portion 30. Furthermore, leakage of exhaust gas from the clearance between the slide portion 44 and the supporting pipe 50 is limited by the sealing member 60.

Further, since the sealing member 60 is a mat made of heat-resistant ceramic fibers, the sealing member 60 is deformed according to the size of the clearance between the slide portion 44 and the supporting pipe 50 even if this clearance changes in size due to thermal expansion of the slide portion 44 of the inner housing member 40 and the supporting pipe 50 supporting the slide portion 44. Thus, even under high temperature, the leakage of the exhaust gas from the clearance between the slide portion 44 and the supporting pipe 50 is reliably limited.

According to the turbine housing and the exhaust gas turbine supercharger according to this embodiment described above, the following advantages are obtained.

(1) The distal portion of the inner housing member 40 is the slide portion 44, which is slidable in the axial direction C. Further, the proximal portion 43 of the inner housing member 40 is fixed to the proximal housing portion 20 at a part closer to the distal side than the proximal portion 23 of the proximal housing portion 20. Further, the scroll portion is formed by the inner housing member 40 and the proximal scroll portion 21 of the proximal housing portion 20, which is located closer to the proximal side than the inner housing member 40. According to this configuration, changes of the clearance between the turbine wheel 2 and the shroud surface 42 of the inner housing member 40, i.e., the tip clearance, are reduced. Further, the rigidity of the inner housing member 40 is increased without increasing the thickness of the inner housing member 40. Thus, vibration of the inner housing member 40 is reliably suppressed while a weight increase is limited.

(2) The outer housing member has a split structure composed of the proximal housing portion 20 covering the proximal side of the turbine wheel 2 and the distal housing portion 30 provided closer to the distal side than the proximal housing portion 20. According to this configuration, the outer housing member having a complicated shape to form a part of the scroll portion of the turbine housing 10 can be easily formed by die pressing.

(3) The distal portion 24 of the proximal housing portion 20, the proximal portion 33 of the distal housing portion 30 and the proximal portion 43 of the inner housing member 40 are joined to overlap each other. According to this configuration, even if the blades of the turbine wheel 2 are crushed and scattered due to entry of foreign matter, penetration of crushed pieces through the turbine housing 10 reliably prevented.

(4) The distal portion 24 of the proximal housing portion 20, the proximal portion 33 of the distal housing portion 30 and the proximal portion 43 of the inner housing member 40 extend in the axial direction C of the turbine wheel 2. According to this configuration, since joining portions of the respective housing portions 20, 30 and the inner housing member 40 constituting the turbine housing 10 are shaped to extend in the axial direction C of the turbine wheel 2, these housing portions 20, 30 and inner housing member 40 can be easily formed by die pressing.

(5) The supporting pipe 50 slidably supporting the slide portion 44 of the inner housing member 40 is coupled to the inner peripheral surface of the distal housing portion 30, and the sealing member 60 for sealing the clearance between the slide portion 44 and the supporting pipe 50 is provided between the slide portion 44 of the inner housing member 40 and the supporting pipe 50. Specifically, the sealing member 60 is a mat made of heat-resistant ceramic fibers. According to this configuration, leakage of exhaust gas from the clearance between the slide portion 44 and the supporting pipe 50 can be reliably limited even under high temperature while the slide portion 44 of the inner housing member 40 is slidably supported by the supporting pipe 50 coupled to the inner peripheral surface of the distal housing portion 30.

(6) The proximal housing portion 20, the distal housing portion 30 and the inner housing member 40 are respectively formed using a metal plate. According to this configuration, since the turbine housing 10 is formed using a metal plate, the turbine housing 10 can be easily thinned and thermal capacity of the turbine housing 10 itself can be easily reduced as compared with the case where the turbine housing 10 is formed by casting. Thus, warm-up performance of a catalytic device arranged downstream of the exhaust gas turbine supercharger 1 including the turbine housing 10 in an exhaust gas flow direction can be improved.

The turbine housing and the exhaust gas turbine supercharger according to the present invention are not limited to the configurations illustrated in the above embodiment and may be embodied, for example, as follows by being appropriately modified.

Although the proximal housing portion 20, the distal housing portion 30 and the inner housing member 40 are joined to each other by arc welding in the above embodiment, a method for joining these is not limited to arc welding, and known joining methods including other welding methods may also be adopted.

Although the proximal housing portion 20, the distal housing portion 30 and the inner housing member 40 are respectively formed by die pressing in the above embodiment, these housing portions and inner housing member may be formed by another forming method.

As illustrated in the above embodiment, to reliably limit the leakage of the exhaust gas from the clearance between the slide portion 44 and the supporting pipe 50 even under high temperature, the sealing member 60 is preferably made of a mat made of ceramic fibers containing alumina and the binding agent. However, the material of the sealing member according to the present invention is not limited to this, and the sealing member may be, for example, made of other ceramic material and binding agent.

In the above embodiment, the sealing member 60, which is a separate member, is provided between the slide portion 44 of the inner housing member 40 and the supporting pipe 50. Instead of this, if the slide portion or the supporting pipe itself is, for example, formed to be flexible in a radial direction of the turbine wheel, a sealing mechanism can be formed by the slide portion and the supporting pipe. In this case, the sealing member can be omitted.

In the above embodiment, the slide portion 44 (movable portion) of the inner housing member 40 is supported over the entire circumference by the tubular supporting pipe 50. However, the shape of a supporting member according to the present invention is not limited to this. For example, a supporting member for partly supporting the movable portion of the inner housing member in a circumferential direction of the movable portion may be adopted.

Since the inner housing member 40 is present inside the distal housing portion 30, heat in the turbine housing 10 is transferred to the distal housing portion 30 via the inner housing member 40. On the other hand, since the heat in the turbine housing 10 is directly transferred to the proximal housing portion 20, the proximal housing portion 20 receives more heat than the distal housing portion 30 and is more likely to reach a high temperature. As a result, a problem may arise that the proximal housing portion 20 tends to be thermally deformed. Accordingly, if the thickness of the proximal housing portion is, for example, made larger than that of the distal housing portion, the rigidity of the proximal housing portion can be easily made higher than that of the distal housing portion. In this way, the thermal deformation of the proximal housing portion can be reliably limited. In this case, it is not necessary to unnecessarily increase the rigidity of the distal housing portion. A method for increasing the rigidity of the proximal housing portion is not limited to the aforementioned thickening. For example, the rigidity of the proximal housing portion may be increased by forming a reinforcing rib. Alternatively, the proximal housing portion may be made of a material having a higher heat-resistant strength than the distal housing portion, i.e., a material that is difficult to thermally deform.

To easily form the housing portions 20, 30 and the inner housing member 40 by die pressing, it is desirable that the distal portion 24 of the proximal housing portion 20, the proximal portion 33 of the distal housing portion 30 and the proximal portion 43 of the inner housing member 40 be shaped to extend in the axial direction C of the turbine wheel 2 as illustrated in the above embodiment. However, the shapes of the proximal housing portion, the distal housing portion and the inner housing member according to the present invention are not limited to these, and the proximal portions and the distal portion of these may be curved to the extent that they can be joined to each other.

To prevent the blades of the turbine wheel 2 from penetrating through the turbine housing 10 when being crushed and scattered, it is desirable that the distal portion 24 of the proximal housing portion 20, the proximal portion 33 of the distal housing portion 30 and the proximal portion 43 of the inner housing member 40 be joined to overlap each other as illustrated in the above embodiment. However, the present invention is not limited to this. For example, as shown in FIG. 4, a proximal portion 143 of an inner housing member 140 may be joined to the inner peripheral surface of a distal housing portion 130. In this case, exhaust gas in a scroll portion is allowed to smoothly flow since a step on the inner peripheral surface of the scroll portion becomes smaller. Further, in this case, if the thickness of the inner housing member 140 and that of a proximal housing portion 120 are equal, there is no step on the inner peripheral surface of the scroll portion, wherefore an influence on the flow of the exhaust gas in the scroll portion by this step is avoided. FIG. 4 also shows a distal portion 124 of the proximal housing portion 120 and a proximal portion 133 of the distal housing portion 130.

To form the outer housing member by die pressing, it is desirable that the outer housing member have the split structure composed of the proximal housing portion 20 and the distal housing portion 30 as illustrated in the above embodiment. However, the method for forming the outer housing member is not limited to die pressing. Thus, the outer housing member can have an integral structure in which a proximal housing portion and a distal housing portion are integral to each other, for example, if being formed by hydroforming.

DESCRIPTION OF THE REFERENCE NUMERALS

1 . . . exhaust gas turbine supercharger, 2 . . . turbine wheel, 2a . . . blade portion, 3 . . . turbine shaft, 4 . . . proximal flange, 5 . . . distal flange, 6 . . . upstream flange, 10 . . . turbine housing, 20, 120 . . . proximal housing portion (outer housing member), 21 . . . proximal scroll portion, 23 . . . proximal portion, 24, 124 . . . distal portion, 30, 130 . . . distal housing portion (outer housing member), 33, 133 . . . proximal portion, 34 . . . first reduced diameter portion, 35 . . . second reduced diameter portion, 40, 140 . . . inner housing member, 41 . . . distal scroll portion, 42 . . . shroud surface, 43, 143 . . . proximal portion, 44 . . . slide portion (movable portion), 50 . . . supporting pipe (supporting member), 51 . . . enlarged diameter portion, 52 . . . reduced diameter portion, 60 . . . sealing member

The invention claimed is:

1. A turbine housing for enclosing a turbine wheel, comprising:
an outer housing member having a proximal housing portion and a distal housing portion; and
an inner housing member provided inside the outer housing member, the inner housing member having a shroud surface, which faces a blade portion of the turbine wheel in an axial direction of the turbine wheel, wherein
a side close to a turbine shaft in the axial direction is referred to as a proximal side, and a side distant from the turbine shaft is referred to as a distal side;
a distal portion of the inner housing member is a movable portion displaceable relative to the outer housing member in the axial direction;
a proximal portion of the inner housing member is fixed to the outer housing member at a part closer to the distal side than a proximal portion of the outer housing member;
a scroll portion is formed by the inner housing member and a part of the outer housing member that is located closer to the proximal side than the inner housing member;
a distal portion of the proximal housing portion, a proximal portion of the distal housing portion, and the proximal portion of the inner housing member are joined to overlap each other and form a portion of the scroll portion; and
a joined portion, which is formed by the portion of the scroll portion, that includes: (i) the distal portion of the proximal housing portion, (ii) the proximal portion of the distal housing portion and (iii) the proximal portion of the inner housing member, the joined portion being radially overlapped with the turbine wheel.

2. The turbine housing according to claim 1, wherein the proximal housing portion of the outer housing member is configured to cover a proximal portion of the turbine wheel and the distal housing portion of the outer housing member is provided closer to the distal side than the proximal housing portion, and the proximal housing portion and the distal housing portion are split from each other.

3. The turbine housing according to claim 2, wherein the distal portion of the proximal housing portion, the proximal portion of the distal housing portion, and the proximal portion of the inner housing member extend in the axial direction.

4. The turbine housing according to claim 2, wherein the proximal housing portion has a higher rigidity than the distal housing portion.

5. The turbine housing according to claim 4, wherein the proximal housing portion and the distal housing portion are formed of the same material, and the proximal housing portion is thicker than the distal housing portion.

6. The turbine housing according to claim 2, wherein
a supporting member for displaceably supporting the movable portion of the inner housing member is coupled to an inner peripheral surface of the outer housing member, and
a sealing member for sealing a clearance between the movable portion and the supporting member is provided between the movable portion and the supporting member.

7. The turbine housing according to claim 6, wherein the sealing member is formed of ceramic fibers and a binding agent.

8. The turbine housing according to claim 2, wherein the proximal housing portion, the distal housing portion, and the inner housing member are respectively formed using a metal plate.

9. The turbine housing according to claim 1, wherein the proximal portion of the inner housing member is in direct contact with the distal portion of the proximal housing portion.

10. An exhaust gas turbine supercharger for supercharging by a turbine wheel being rotated by exhaust gas energy, comprising a turbine housing for enclosing the turbine wheel, the turbine housing including:
an outer housing member having a proximal housing portion and a distal housing portion; and
an inner housing member provided inside the outer housing member, the inner housing member having a shroud surface, which faces a blade portion of the turbine wheel in an axial direction of the turbine wheel, wherein
a side close to a turbine shaft in the axial direction is referred to as a proximal side, and a side distant from the turbine shaft is referred to as a distal side;
a distal portion of the inner housing member is a movable portion displaceable relative to the outer housing member in the axial direction;

a proximal portion of the inner housing member is fixed to the outer housing member at a part closer to the distal side than a proximal portion of the outer housing member;

a scroll portion is formed by the inner housing member and a part of the outer housing member that is located closer to the proximal side than the inner housing member;

a distal portion of the proximal housing portion, a proximal portion of the distal housing portion, and the proximal portion of the inner housing member are joined to overlap each other and form a portion of the scroll portion; and a joined portion, which is formed by the portion of the scroll portion, that includes: (i) the distal portion of the proximal housing portion, (ii) the proximal portion of the distal housing portion and (iii) the proximal portion of the inner housing member, the joined portion being radially overlapped with the turbine wheel.

11. The turbine housing according to claim 10, wherein the proximal portion of the inner housing member is in direct contact with the distal portion of the proximal housing portion.

* * * * *